United States Patent
Lee

(10) Patent No.: US 7,129,655 B2
(45) Date of Patent: Oct. 31, 2006

(54) IMAGE DISTORTION CORRECTION APPARATUS CAPABLE OF CORRECTING MISCONVERGENCE USING AN AMPLIFIER

(75) Inventor: Joon-hwan Lee, Gunpo (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 710 days.

(21) Appl. No.: 10/409,096

(22) Filed: Apr. 9, 2003

(65) Prior Publication Data

US 2003/0206251 A1    Nov. 6, 2003

(30) Foreign Application Priority Data

May 2, 2002   (KR) ............................... 2002-24207

(51) Int. Cl.
  *H01J 29/51*    (2006.01)
  *H04N 9/28*    (2006.01)

(52) U.S. Cl. ................. 315/368.11; 315/387; 348/807; 348/806

(58) Field of Classification Search ..................... None
See application file for complete search history.

(56) References Cited

U.S. PATENT DOCUMENTS 4,857,998 A * 8/1989 Tsujihara et al. .......... 348/747

6,853,157 B1 * 2/2005 Lee et al. .............. 315/368.11

FOREIGN PATENT DOCUMENTS

| CN | 1155209 A | 7/1997 |
|---|---|---|
| CN | 1313010 A | 9/2001 |
| JP | 11-275380 A | 10/1999 |
| JP | 2001-57682 A | 2/2001 |

\* cited by examiner

*Primary Examiner*—Tuyet Thi Vo
(74) *Attorney, Agent, or Firm*—Sughrue Mion, PLLC

(57) ABSTRACT

An image distortion correction apparatus is disclosed which can correct misconvergence using a D-class amplifier. The image distortion correction apparatus has an image processor for detecting an image signal and horizontal/vertical synchronous signals from a signal received from an external source; a distortion value calculator for calculating a misconvergence value occurring when the image signal is scanned based on the horizontal/vertical synchronous signals; a correction value calculator for calculating a convergence correction value of a pulse waveform to correct misconvergence of the image signal based on the misconvergence value; an amplifier for performing a D-class amplification with respect to the convergence correction value; and a convergence yoke fixed to a cathode ray tube (CRT) for controlling a path of an electron beam corresponding to the image signal based on the convergence correction value amplified in the amplifier.

26 Claims, 11 Drawing Sheets

IMAGE DISTORTION CORRECTION APPARATUS CAPABLE OF CORRECTING MISCONVERGENCE USING AN AMPLIFIER

BACKGROUND OF THE INVENTION

1. Field of the Invention

The present invention generally relates to an image distortion correction apparatus of a projection television system, and more particularly to an image distortion correction apparatus of a projection television system capable of correcting misconvergence of an image signal scanned by a magnetic field formed in a coil of a convergence yoke (CY) by amplifying an electric signal applied to correct the misconvergence of the image signal and providing the amplified electric signal to the convergence yoke. The present application is based on Korean Patent Application No. 2002-24207 filed on May 2, 2002, which is incorporated herein by reference.

2. Description of the Prior Art

In general, a television system carries out functions of respectively outputting to speakers and to a screen, audio and video signals, which are transferred over a wire and wirelessly. In such a television system, as the quality of life gets better, a high-quality television system becomes more desirable. A high-quality television system, such as a projection television system, uses lenses to enlarge an image based on respective red (R), green (G), and blue (B) cathode ray tubes (CRT), projects the enlarged image into a mirror, and reflects the image incident on the mirror to output the image onto a large screen, to thereby display a received image signal as an enlarged television image.

FIG. 1 is a view for schematically showing a display device of a general projection television system. The display device has a RGB CRTs 2a, 2b, and 2c (hereinafter, referred to as '2'), a mirror 4, and a screen 6. The RGB CRT 2 projects R, G, and B images by electron beams respectively. At this time, the RGB CRT 2 is provided with lenses (not shown) enlarging the respective images. Accordingly, the images are enlarged and then projected. The mirror 4 receives and reflects the R, G, and B images respectively projected through the lenses. The screen 6 displays the reflected and enlarged images received from the mirror 4.

At this time, optical distortions occur when the images are displayed on the screen 6 of the projection television system, because of influences due to optical devices and the positions and angles of plural CRTs 2 prepared for the R, G, and B images.

FIG. 2 is a view for showing respective R, G, and B image trajectories appearing on the screen 6 of FIG. 1. As shown in FIG. 2, the R, G, and B image trajectories displayed on the screen 6 may become incongruous, skew, and/or angled, depending on the relations between the arranged positions of the RGB CRTs 2 and the position of the mirror 4.

Such optical distortions have nonlinear characteristics due to various factors such as the positions of the CRTs 2 and the mirror 4, lens magnifications, magnetic fields formed based on currents applied to the CRTs 2, and so on.

The projection television system has three RGB CRTs 2a, 2b, and 2c, which are generally not placed in the same position but arranged side by side, so respective R, G, and B electron beams are not projected on the same spot of the screen 6. Accordingly, in the projection television system, convergence distortions appear, together with optical distortions, which prevent proper color images from being obtained.

FIG. 3 is a view for schematically showing a conventional image distortion correction apparatus of a projection television system. The image distortion correction apparatus has amplification parts 10 and 20 for amplifying electric signals for correcting an image misconvergence, convergence yokes 32a, 32b, and 32c for forming certain magnetic fields based on the currents of the amplified electric signals from the amplification parts 10 and 20, and CRTs 2a, 2b, 2c having the convergence yokes 32a, 32b, and 32c fixed thereto for controlling scanning directions based on the magnetic fields formed in the convergence yokes 32a, 32b, and 32c for respective RGB images.

The amplification parts 10 and 20 have three amplifiers 12, 14, and 16, and 22, 24, and 26, respectively, and the respective three amplifiers are packaged in one module. Further, the amplifiers 12, 14, 16, 22, 24, and 26 are grouped by two into pairs, and one amplifier of each pair amplifies an electric signal for controlling the horizontal convergence and the other amplifier of the pair amplifies an electric signal for controlling the vertical convergence.

FIG. 4 is an exemplary cross-sectioned view of the convergence yoke 32a. The convergence yoke 32a is annularly fixed to the CRT 2a. The convergence yoke 32a has coils H1 and H2 symmetrically arranged on the left and right, into which currents are applied to control the horizontal (H) convergence of an R image, and has coils V1 and V2 symmetrically arranged on the up and down sides into which currents are applied to control the vertical (V) convergence of the R image. Accordingly, a certain magnetic field is formed based on the currents applied in the coils H1, H2, V1, and V2. Therefore, an electron beam for the R image is corrected for its scan direction based on a magnetic field formed in the convergence yoke 32a.

FIG. 5 is a view for showing the amplifier 12, from the amplification parts 10 and 20 of FIG. 3, for amplifying a voltage applied to control the horizontal convergence of the R image. The amplifier 12 amplifies an applied voltage and outputs an amplified voltage to the convergence yoke 32a. The convergence yoke 32a forms a certain magnetic field in a coil L based on the applied voltage. In the meantime, a voltage due to a current passing through the coil L is fed back to the amplifier 12. Accordingly, the amplifier 12 amplifies and outputs a difference value of the voltage applied from external and the voltage fed back. Such an amplifier 12 is called 'Operational Amplifier (OP AMP)'. Such an operational amplifier is a C-class amplifier which is constituted with power transistors.

However, the power transistor constructing the Operational Amplifier is a current-driving device and, at the same time, has a large conducting resistance valve. Therefore, when a large current flows in the Operation Amplifier, the Operational Amplifier has a high heat emission. Accordingly, in the conventional art, there exists a problem in that a large-sized heat-sink plate is required to radiate such heat. That is, since the heat emission occurring from the power transistor exponentially increases with respect to a conducting current, a larger heat-sink plate is provided for the projection television system to radiate such heat emission, causing a problem in that the volume of a product becomes larger. Further, since a larger heat-sink plate is required compared to the sizes of the integrated circuits (IC) components mounted for the projection television system, there exists difficulties in arranging IC components and printed circuit boards on which IC components are mounted.

Further, since the conventional amplifier 12 is an Operational Amplifier, a differential and amplified current from the amplifier 12 is applied to the convergence yoke 32a. Accordingly, the current flowing in the convergence yoke 32a decreases over time, causing a problem in that misconvergence cannot be exactly corrected as much as desired.

SUMMARY OF THE INVENTION

In order to solve the above problems, it is an object of the present invention to provide an image distortion correction apparatus for a projection television system which can solve a problem of becoming larger in product size because of a heat-sink plate which is required to radiate heat emissions in using C-class amplifiers, each amplifier constructed with a power transistor that is a current-driving device.

Further, it is another object of the present invention to provide an image distortion correction apparatus for a projection television system which can correct a difference value of misconvergences occurring due to the decrease of a current flowing in a convergence yoke over time with respect to a voltage applied to correct the misconvergence.

The above objects are achieved, according to the present invention, by an image distortion correction apparatus comprising: an image processing means for detecting an image signal and horizontal/vertical synchronous signals from a signal received from an external source; a distortion value calculation means for calculating a misconvergence value occurring when the image signal is scanned based on the horizontal/vertical synchronous signals; a correction value calculation means for calculating a convergence correction value of a pulse waveform to correct misconvergence of the image signal based on the misconvergence value; an amplification means for performing an amplification with respect to the convergence correction value; and a convergence yoke fixed to a cathode ray tube (CRT) for controlling a path of an electron beam corresponding to the image signal based on the convergence correction value amplified in the amplification means. Preferably, the amplification is a D-class amplification.

At this time, the amplification means has a first amplifier and a second amplifier including an N-channel Enhanced metal oxide semiconductor field effect transistor (N-channel E-MOS FET) of a bridge structure for selectively amplifying and outputting the convergence correction value calculated from the correction value calculation means.

The convergence correction value calculated from the correction value calculation means is an electric signal and the electric signal is below 2 volts. Further, the convergence correction value amplified in the amplification means is an electric signal and the electric signal is below 25 volts.

Preferably, the correction value calculation means includes a correction value input part for inputting the misconvergence value calculated in the distortion value calculation means; a triangular wave generation part for generating a triangular wave using a nonlinear device; a comparison part for comparing an added misconvergence value and a value of the triangular wave based on a point crossing the misconvergence value and the triangular wave; and a pulse wave generation part for generating a pulse width modulation signal based on a result of the comparison of the comparison part.

In the meantime, the convergence yoke feeds back to the correction value calculation means a voltage value with respect to a current passing a coil. The correction value calculation means calculates the convergence correction value based on at least the fed-back voltage value. Preferably, the correction value calculation means further includes a feedback input part for inputting the voltage value fed back from the convergence yoke; and an addition part for adding the misconvergence value inputted in the correction value input part and the voltage value inputted in the feedback input part. Accordingly, the pulse wave generation part generates a signal based on an addition of the misconvergence value and the voltage value in the addition part, and the convergence correction value based on the triangular wave generated from the triangular wave generation part. The convergence yoke has a plurality of coils arranged in pairs in a circular symetric structure and forming a certain magnetic field due to an applied current, and a current from an identical source is applied to the coils of each pair symmetrically arranged. Accordingly, the amplification means amplifies the current of a voltage corresponding to the convergence correction value and outputs the amplified current to the convergence yoke.

The image distortion correction apparatus of the present invention further includes a low-pass filter arranged between the amplification means and the convergence yoke for filtering the convergence correction value amplified in the amplification means. The distortion value calculation means calculates a deflection distortion value occurring when the image signal is scanned based on the horizontal/vertical synchronous signals, and deflection yokes respectively mounted to the CRT are further included to apply certain currents for horizontal/vertical deflections of the electron beam of the image signal based on the deflection distortion value.

In the meantime, the above objects are achieved, according to the present invention, by an image distortion correction method using an image distortion correction apparatus, comprising steps of detecting an image signal and horizontal/vertical synchronous signals of the image signal from a signal received from an external source; calculating a misconvergence value occurring when the image signal is scanned based on the horizontal/vertical synchronous signals; calculating a convergence correction value of a pulse waveform for correcting misconvergence with respect to the image signal based on the misconvergence value; performing a D-class amplification by using D-class amplifiers with respect to the convergence correction value; and controlling a path of an electron beam corresponding to the image signal by a magnetic field formed based on a passing current of the D-class-amplified convergence correction value.

Preferably, the amplifiers performing the D-class amplification are N-channel enhanced metal oxide semiconductor field effect transistors arranged in a bridge structure with two of the amplifiers. The convergence correction value is an electric signal and the electric signal is below 2V. Further, the D-class-amplified convergence correction value is an electric signal and the electric signal is below 25V.

Preferably, the step of calculating the convergence correction value includes substeps of inputting the misconvergence value; generating a triangular wave by a set frequency; comparing the misconvergence value and a value of the triangular wave based on a point at which the misconvergence value and the triangular wave are crossed; and generating a pulse-width-modulation signal based on a result of the comparison.

The image distortion correction method using an image distortion correction apparatus according to an embodiment of the present invention further comprises a step of feeding back a voltage value corresponding to a passing current of the D-class-amplified convergence correction value to the step for calculating the convergence correction value. Accordingly, the convergence correction value is calculated by considering the fed-back voltage value in the step for calculating the convergence correction value.

Preferably, the step for calculating the convergence correction value further comprises substeps of inputting the fed-back voltage value; and adding the fed-back voltage value and the misconvergence value. Accordingly, a signal formed based on an addition of the misconvergence value and the voltage value, and the convergence correction value based on the triangular wave is generated in the pulse signal generation step. Further, the image distortion correction method of the present invention further comprises a step for filtering the amplified convergence correction value through a low pass filter, after the amplification step.

The present invention carries out the D-class amplification using field effect transistors to amplify a convergence correction value, so as to reduce a heat-sink plate size based on a reduced conducting resistance and lowered heat emissions when amplification operations are performed, enabling the entire size of the product to be manufactured smaller as well as the product cost to be lowered. Further, the present invention variably calculates a convergence correction value based on a voltage value fed back from a convergence yoke, enabling misconvergence to be more exactly corrected in the convergence yoke.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENT

Hereinafter, the present invention is described in detail with reference to the accompanying drawings.

Figure 1:
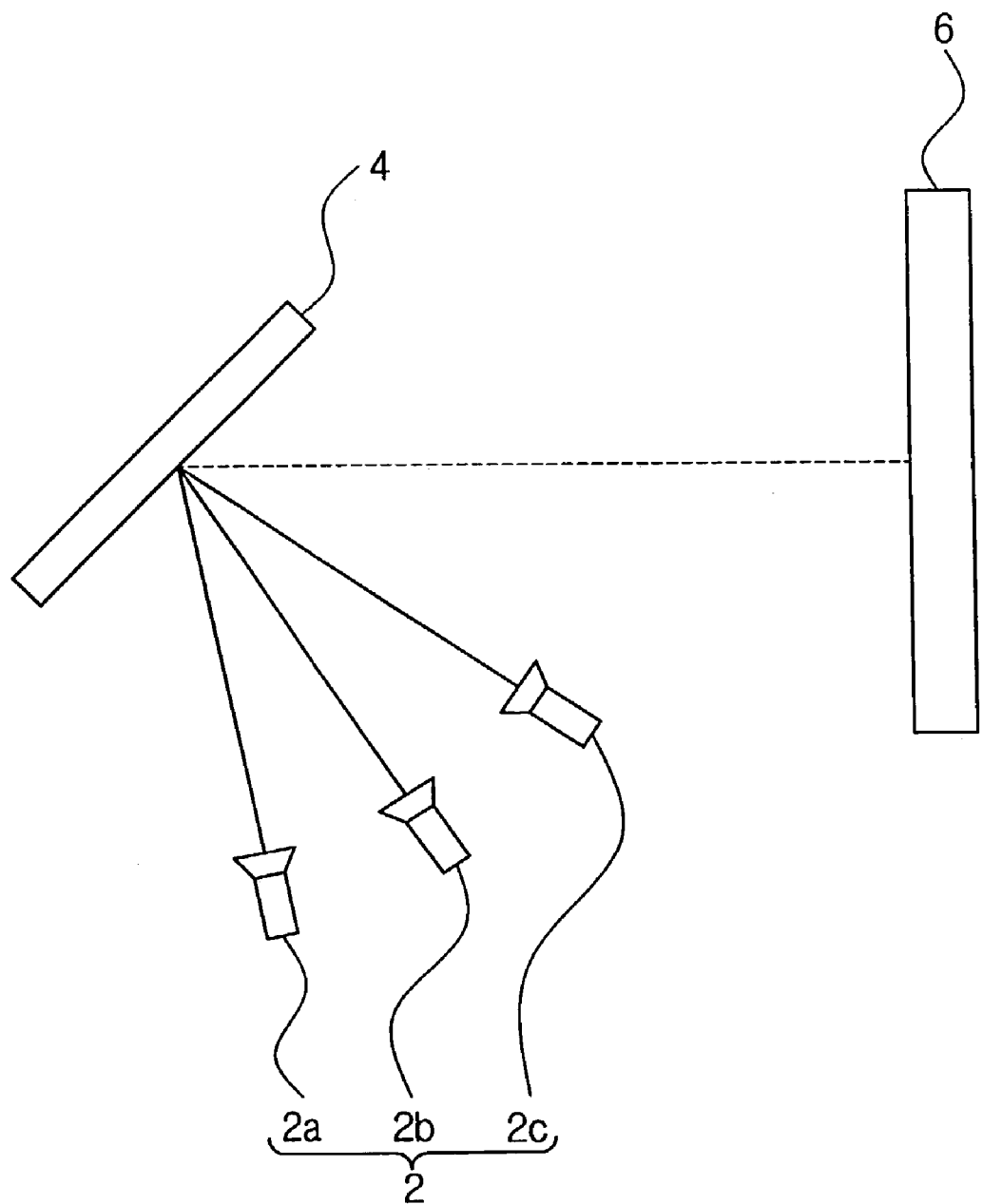
FIG. 1 is a view for schematically showing a display device of a projection television system.
Figure 2:
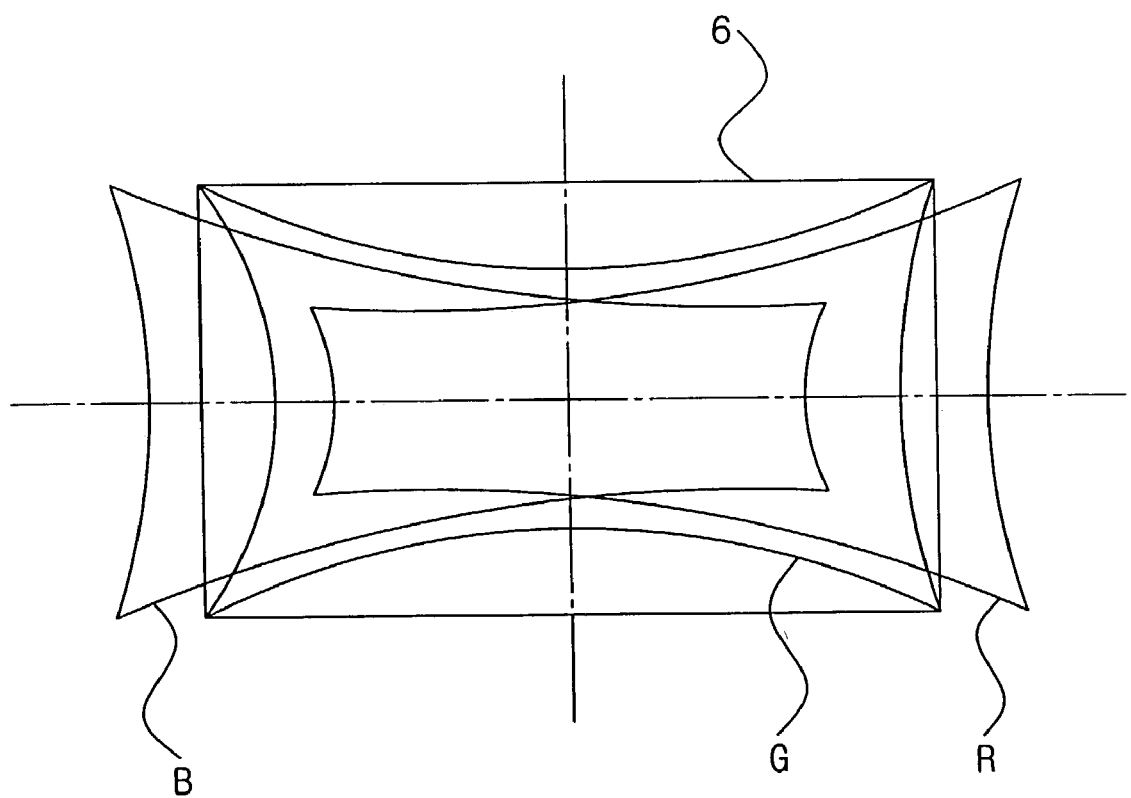
FIG. 2 is a view for showing respective R, G, and B image trajectories appearing on the screen of FIG. 1.
Figure 3:
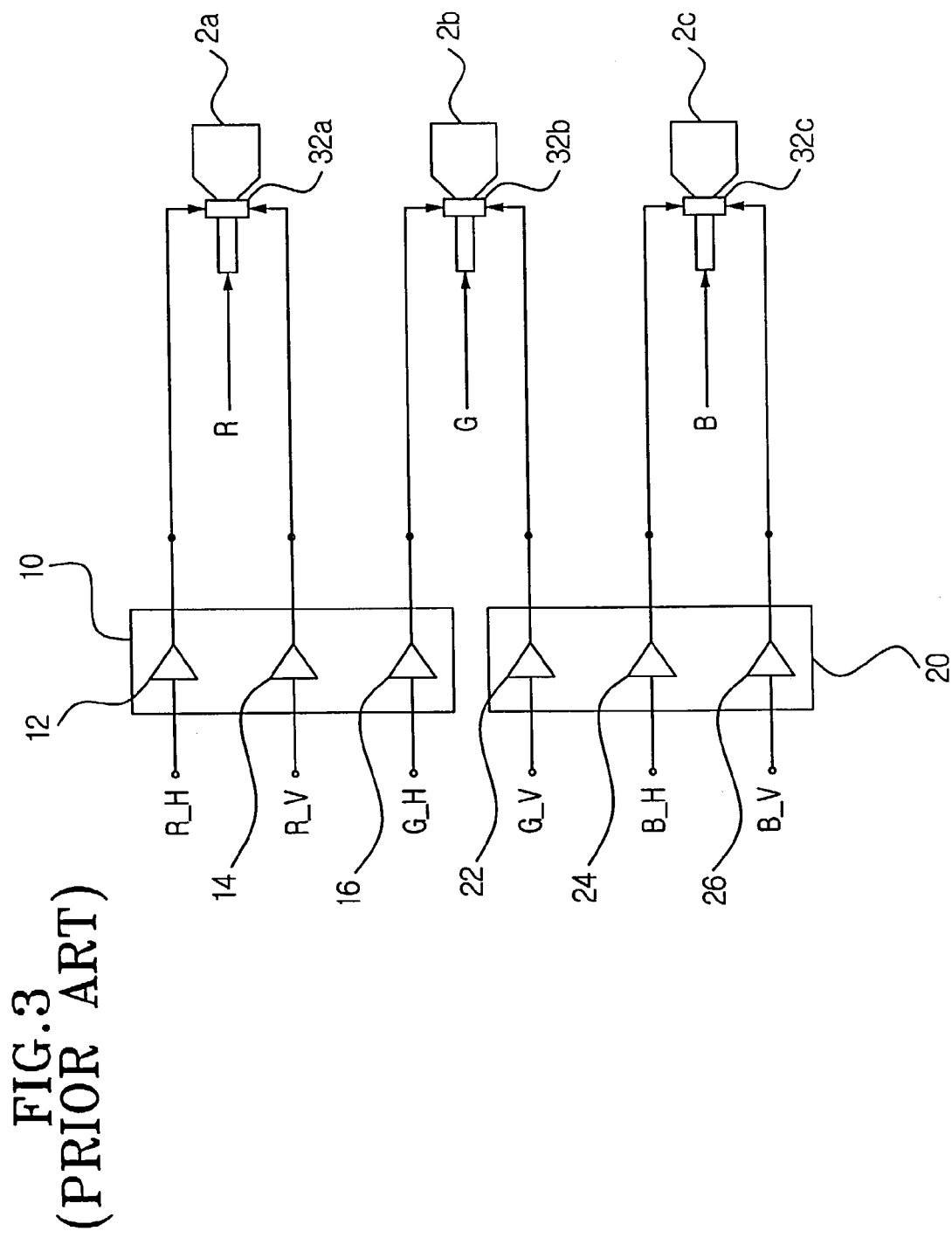
FIG. 3 is a view for schematically showing a conventional image distortion correction apparatus of a projection television system.
Figure 4:
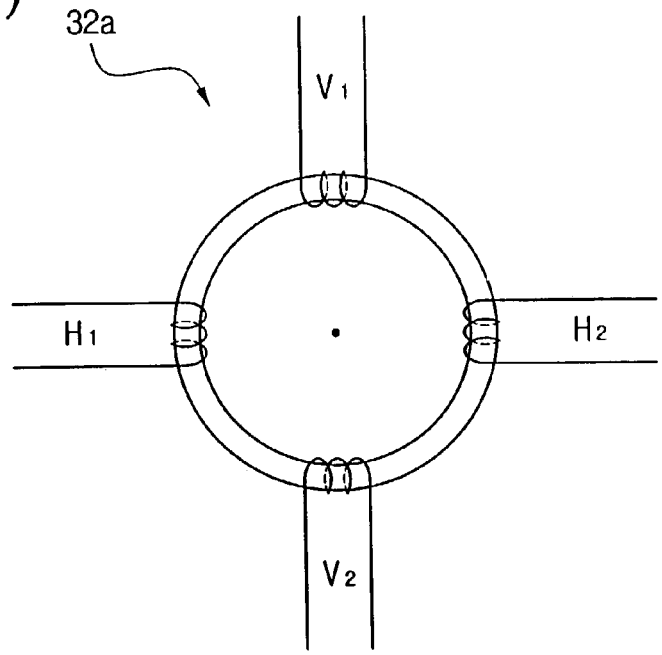
FIG. 4 is an exemplary cross-sectioned view of a convergence yoke of FIG. 3.
Figure 5:
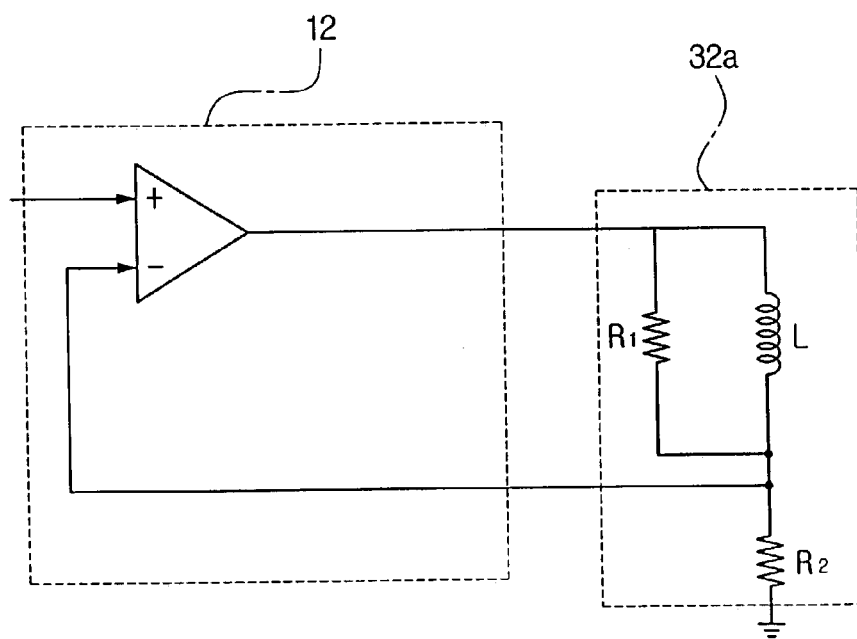
FIG. 5 is a view for showing an amplifier, of the amplifiers of FIG. 3, amplifying a voltage applied to control the horizontal convergence of an R image.
Figure 6:
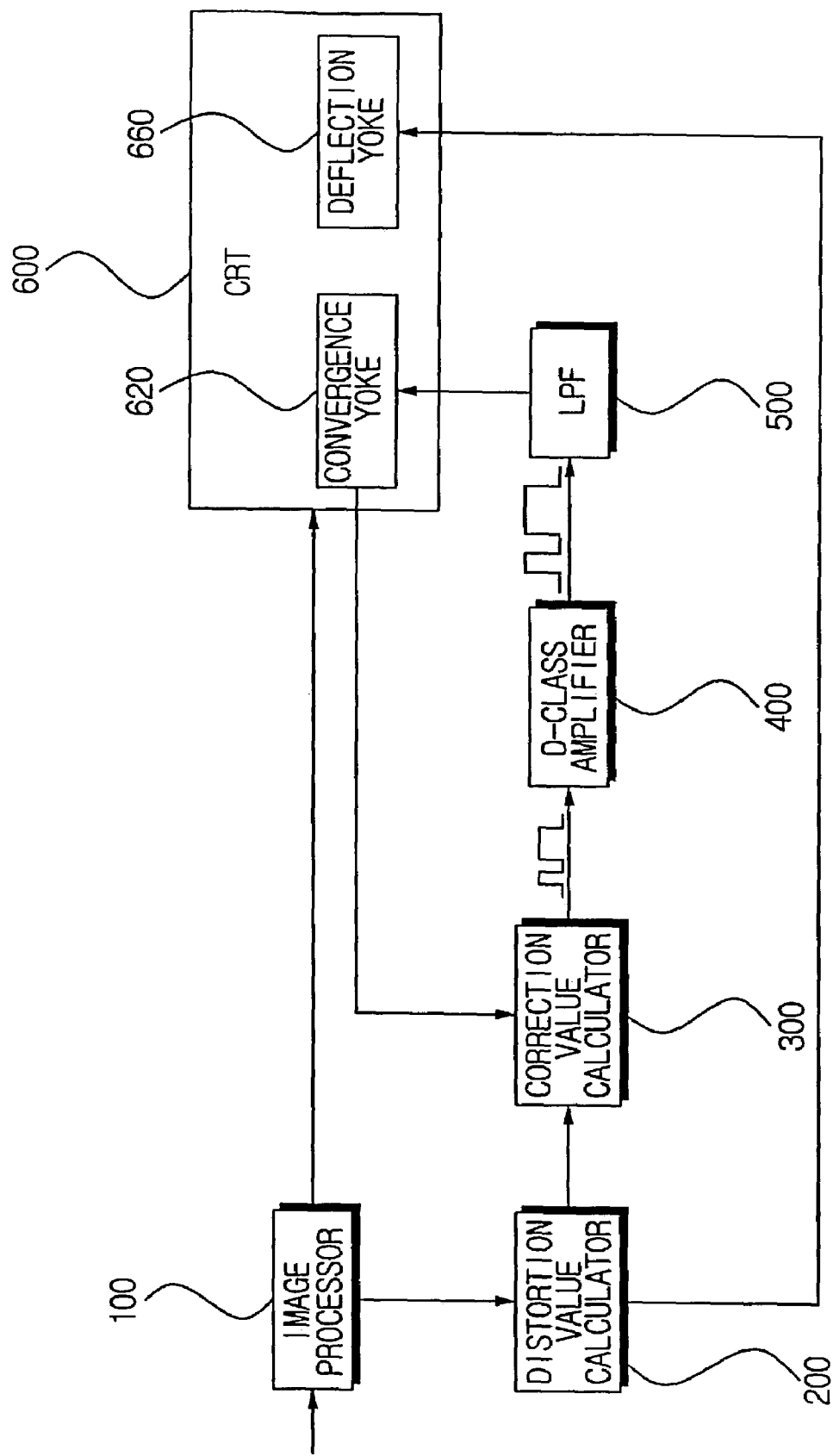
FIG. 6 is a block diagram for showing an image distortion correction apparatus according to a preferred embodiment of the present invention.

FIG. 6 is a block diagram for showing an image distortion correction apparatus according to a preferred embodiment of the present invention. The image distortion correction apparatus has an image processor 100, a distortion value calculator 200, a correction value calculator 300, an amplifier 400, a low pass filter (LPF) 500, and a CRT 600 having a convergence yoke (CY) 620 and a deflection yoke (DY) 660.

The image processor 100 detects an image signal and a horizontal and vertical synchronous signals of the image signal from a signal received from an external signal source. The distortion value calculator 200 calculates a deflection distortion value and a misconvergence value occurring when the image signal is scanned, based on the horizontal/vertical synchronous signals detected from the image processor 100. At this time, the deflection distortion value and the misconvergence value are each analog values, and appear in certain electric signals. Preferably, the deflection distortion value and the misconvergence value appear below 2V.

The correction value calculator 300 calculates a convergence correction value for correcting misconvergence with respect to the image signal, based on the misconvergence value calculated in the distortion value calculator 200. At this time, the convergence correction value appears in a pulse waveform through an application of the pulse width modulation (PWM) applied to the analog electric signal outputted from the distortion value calculator 200.

The amplifier 400, which can be a D-class amplifier, amplifies and outputs a convergence correction value of the pulse waveform calculated in the correction value calculator 300. The amplifier 400 can amplify the inputted convergence correction value up to 25V. At this time, the D-class amplifier demonstrates a small connecting resistance and low heat emissions when performing amplification operations.

The low-pass filter (LPF) 500 filters the convergence correction value amplified in the amplifier 400 based on a pre-set value. The CRT 600 controls scan paths of the image outputted from the image processor 100 based on a magnetic field formed with applications corresponding to the deflection distortion value and the convergence correction value respectively outputted from the distortion value calculator 200 and the low-pass filter 500. Preferably, the deflection yoke 660 of the CRT 600 controls a main path of an electron beam corresponding to an image, and the convergence yoke 620 controls an auxiliary path, such as a minute adjustment, for the scan of an electron beam of which the main path is adjusted by the deflection yoke 660.

Preferably, the convergence yoke 620 feeds back to the correction value calculator 300 a voltage value of a current passing a coil, which generates a magnetic field formed by a current of the convergence correction value outputted from the low-pass filter 500. Accordingly, the correction value calculator 300 can calculate a convergence correction value for carrying out a more exact correction of a convergence distortion by considering the fed-back voltage value when calculating a convergence correction value with respect to the misconvergence value calculated in the distortion value calculator 200.

Therefore, using the amplifier 400 having the D-class amplification function in order to amplify a convergence correction value reduces a conducting resistance and lowers heat emissions when performing amplification operations, enabling heat to be radiated using a smaller heat-sink plate. Reducing a heat-sink plate size enables an entire product size to be manufactured smaller, as well as product costs to be lowered.

Figure 7:
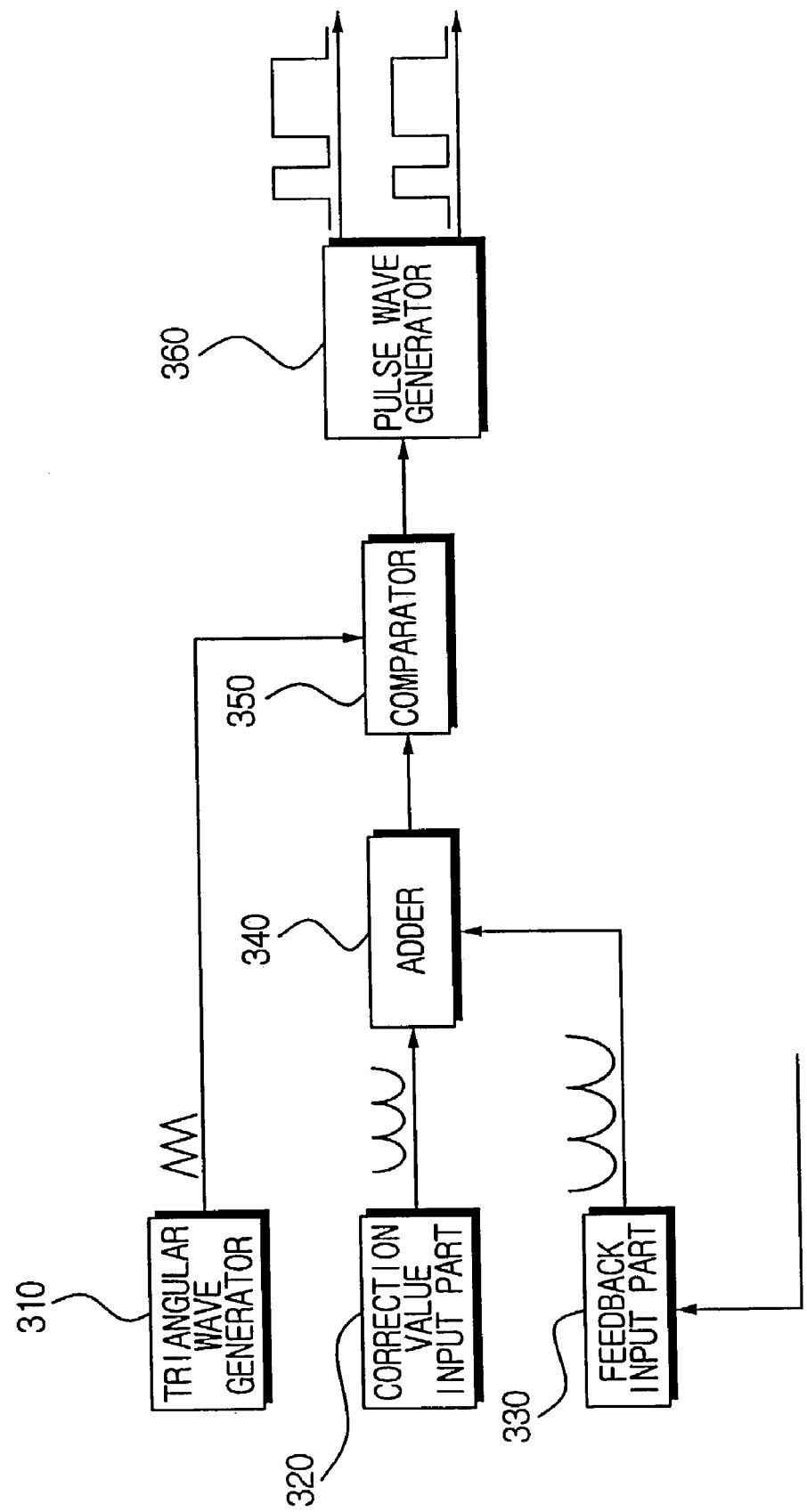
FIG. 7 is a block diagram for showing in detail a correction value calculator of FIG. 6.

FIG. 7 is a block diagram for showing in detail the correction value calculator 300 of FIG. 6. The correction value calculator 300 has a triangular wave generator 310, a correction value input part 320, a feedback input part 330, an adder 340, a comparator 350, and a pulse wave generator 360.

The triangular wave generator 310 generates a triangular wave based on pre-set frequency and amplitude. The correction value input part 320 inputs a misconvergence value outputted from the distortion value calculator 200. The feedback input part 330 inputs a voltage value fed back from the convergence yoke 620. The misconvergence value and the voltage value inputted to the correction value input part 320 and the feedback input part 330 are analog values. The adder 340 adds the misconvergence value and the voltage value inputted in the correction value input part 320 and the feedback input part 330, respectively, and calculates a misconvergence value in order for a voltage value applied to the convergence yoke 620 to have a constant value. The comparator 350 crosses the misconvergence value and the triangular wave outputted from the adder 340 and the triangular wave generator 310, respectively, and compares the respective value magnitudes by using a crossing point. The pulse wave generator 360 generates a pulse-width-modulated pulse waveform based on a compared value in the comparator 350.

Accordingly, the amplifier 400 carries out a digital amplification with respect to a pulse wave indicating digital values outputted from the pulse wave generator 360. Further, a convergence correction value is variably calculated based on a voltage value fed back from the convergence yoke 620, so a more exact misconvergence correction is available in the convergence yoke 620.

Figure 8:
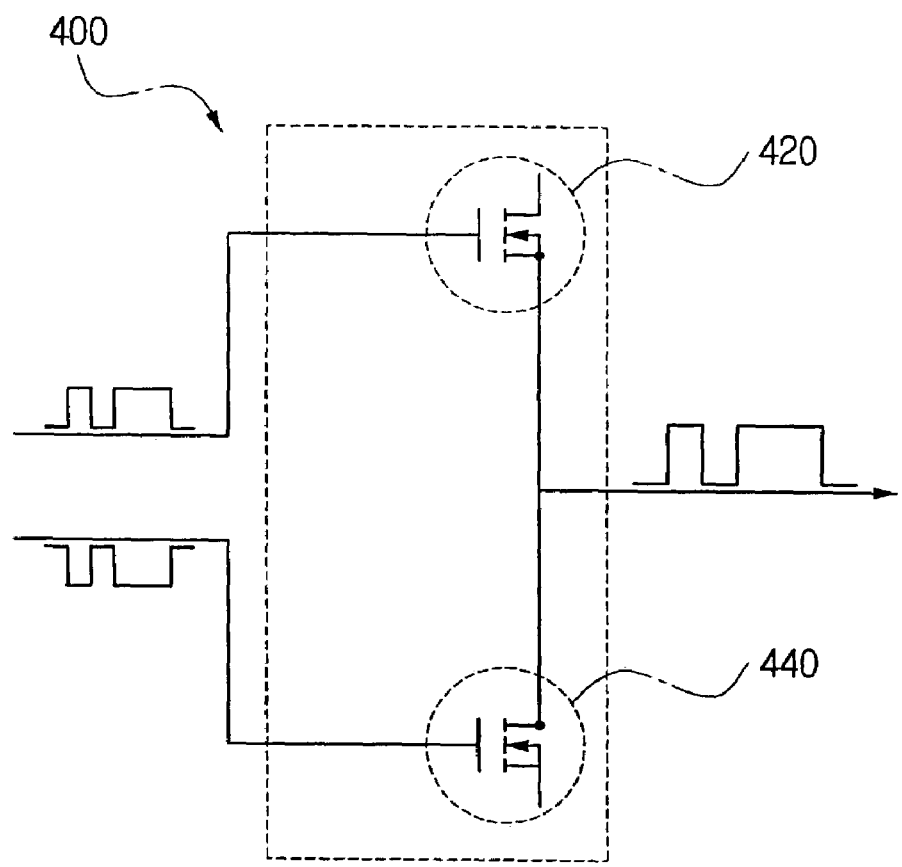
FIG. 8 is an exemplary view for showing an amplifier of FIG. 6.

FIG. 8 is a view for showing one example of the amplifier 400 of FIG. 6. Here, the amplifier 400 performs the D-class amplification. Accordingly, the amplifier 400 has a first amplifier 420 and a second amplifier 440 which selectively amplify and output convergence correction values of a pulse wave outputted from the pulse wave generator 360. In the present embodiment, the first amplifier 420 amplifies and outputs only positive (+) values of convergence correction values, and the second amplifier 440 amplifies and outputs negative (−) values of the convergence correction values. As shown in FIG. 8, the first amplifier 420 and the second amplifier 440 are N-channel E-MOS FETs standing for N-channel Enhanced-Metal Oxide Semiconductor Field Effect Transistors. Such an E-MOS FET is a voltage-driving device with a small conducting resistance, generating low heat emissions when performing amplification operations.

Figure 9:
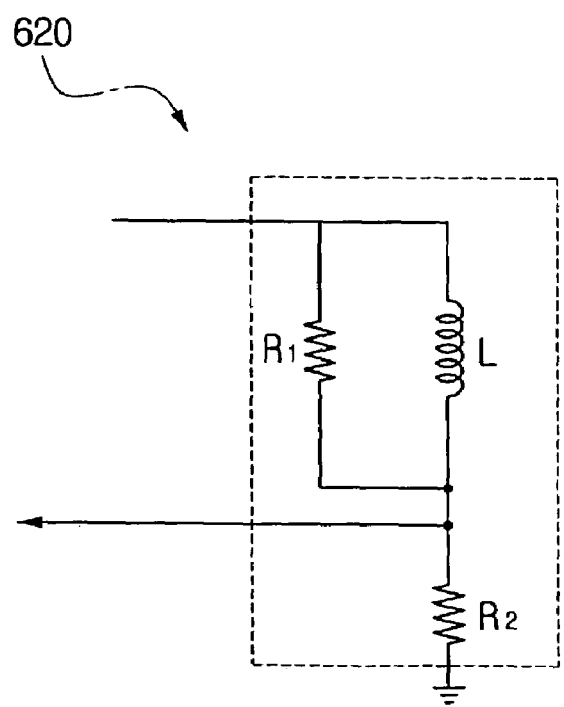
FIG. 9 is a circuit diagram for showing in detail any one of the convergence yokes of FIG. 6.

FIG. 9 is a circuit diagram for showing in detail any one of convergence yokes 620 of FIG. 6. The convergence yoke 620 has a clamping resistor R1, a feedback resistor R2, and a coil L generating a magnetic field due to an applied current. At this time, a voltage value as to a current passing the coil L is fed back to the feedback input part 330 of the correction value calculator 300 by the feedback resistor R2. Accordingly, the convergence yoke 620 of the present embodiment can form a magnetic field of a certain magnitude based on a convergence correction value variably calculated based on, in part, a magnitude of a voltage across the coil L and can correct misconvergence more precisely.

Figure 10:
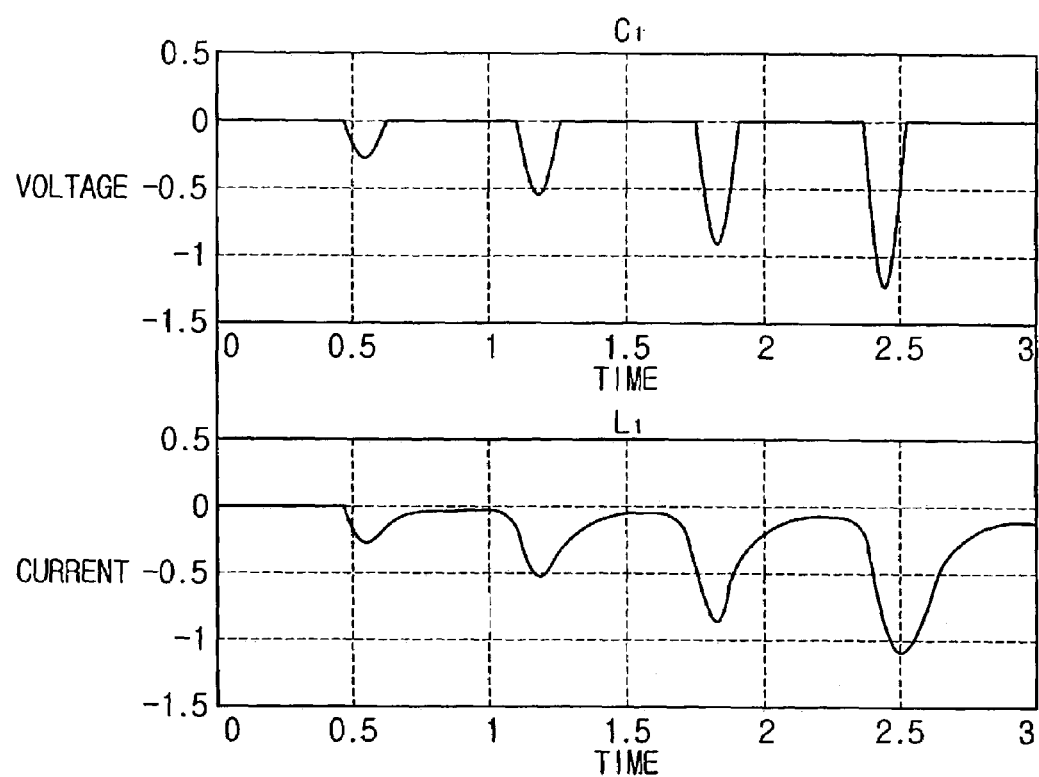
FIG. 10 is a graph for showing measurements of amounts of currents flowing in a coil upon correcting misconvergence using convergence correction values in a state that voltage values are not fed back from a convergence yoke.

FIG. 10 is a graph for showing measurements of the amount of current flowing in the coil L when correcting misconvergence using a convergence correction value C1 in a state that a voltage value is not fed back in the convergence yoke 620.

FIG. 10 shows that the amount of a current L1 passing the coil L with respect to the convergence correction value C1 of a reference value decreases with time lapse. Accordingly, if misconvergence is corrected without considering a voltage value corresponding to a current passing the coil L, there exists a problem of performing an incorrect correction with time lapse.

Figure 11:
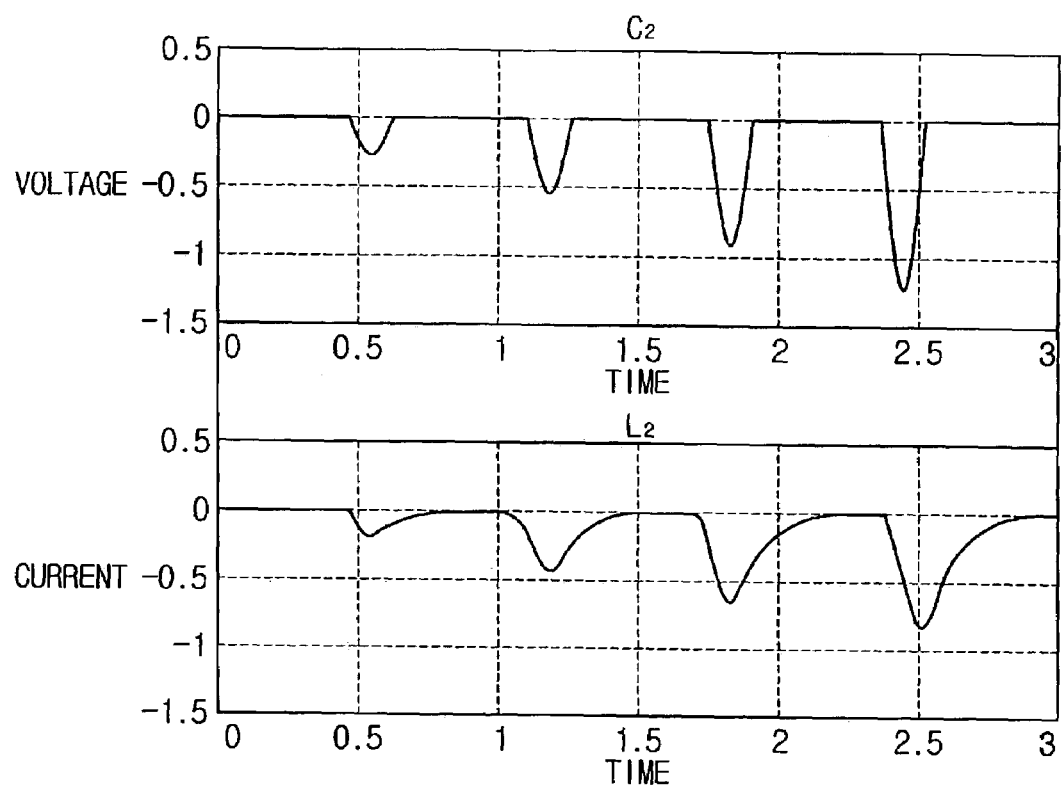
FIG. 11 is a graph for showing measurements of amounts of currents flowing in a coil upon correcting misconvergence using convergence correction values calculated in consideration of voltage values fed back from a convergence yoke according to an embodiment of the present invention.

FIG. 11 is a graph for showing the measurements of the amount of current flowing in the coil L when correcting misconvergence using a convergence correction value C2 calculated based on at least the voltage value fed back in the convergence yoke 620, according to an embodiment of the present invention.

FIG. 11 shows that the amount of current L2 passing the coil L with respect to the convergence correction value C2 of a reference value, is maintained with a constant value. Accordingly, since a magnetic field of a constant magnitude is maintained with the same initial setting value as time lapses, a more exact misconvergence correction becomes possible.

Figure 12:
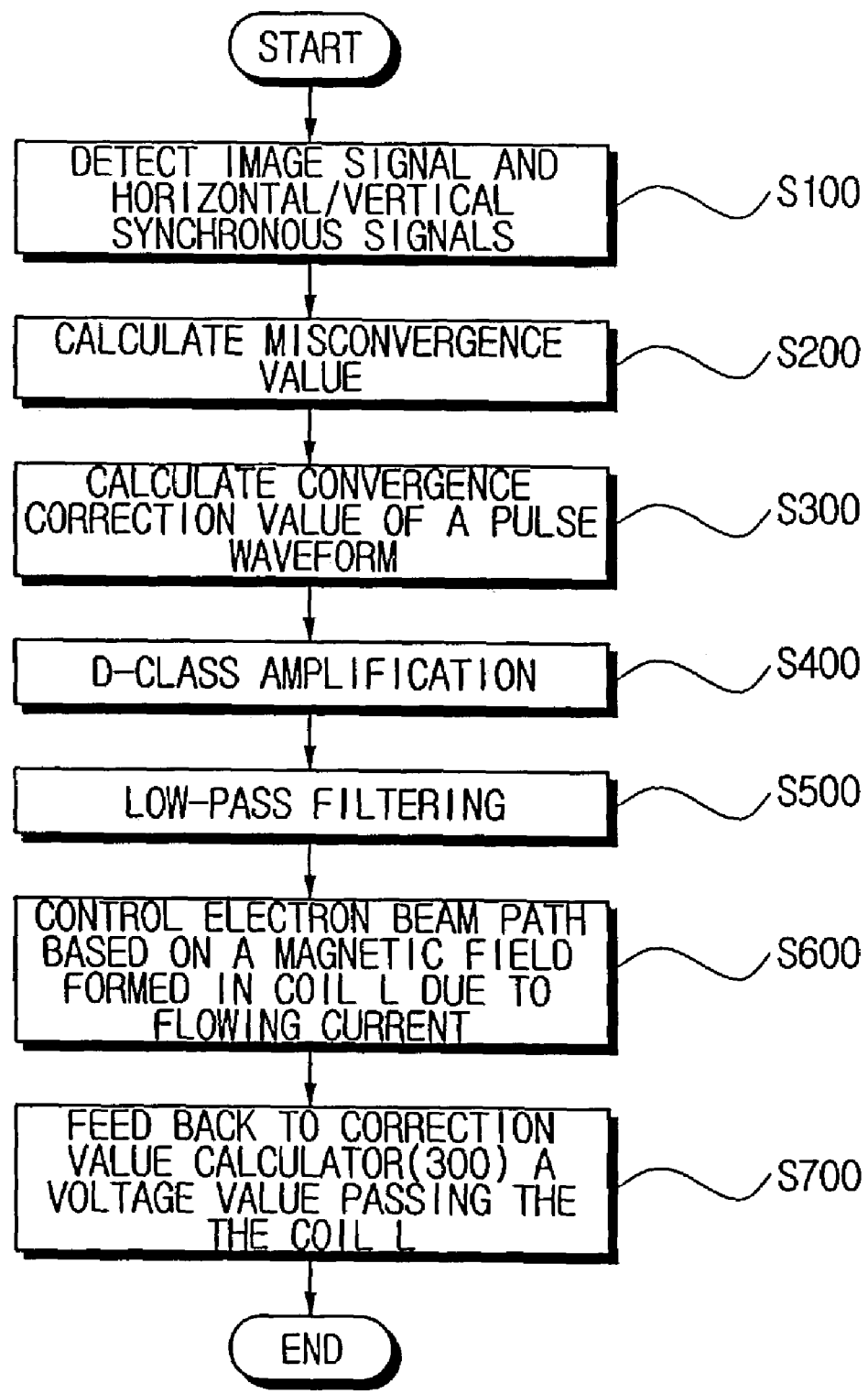
FIG. 12 is a flow chart for showing an image distortion correction method using an image distortion correction apparatus according to a preferred embodiment of the present invention.

FIG. 12 is a flow chart for showing an image distortion correction method using the image distortion correction apparatus according to a preferred embodiment of the present invention.

First, the image processor 100 detects an image signal and horizontal/vertical synchronous signals from a received signal (S100). The distortion value calculator 200 calculates a deflection distortion value and a misconvergence value of the image signal from the horizontal/vertical synchronous signals (S200). The correction value calculator 300 calculates a convergence correction value of a pulse waveform from the misconvergence value (S300). The amplifier 400 performs the D-class amplification with respect to the convergence correction value of a pulse waveform (S400). The low-pass filter (LPF) 500 filters the D-class-amplified convergence correction value based on a set value (S500). The convergence yoke 620 controls a scan path of an electron beam for an image based on a magnetic field formed in the coil L as a current corresponding to the filtered convergence correction value in the low-pass filter 500 is applied (S600). In the meantime, the convergence yoke 620 feeds back to the correction value calculator 300 a voltage value corresponding to the current passing the coil L. Accordingly, the correction value calculator 300 calculates a convergence correction value while considering the fed-back voltage value.

Figure 13:
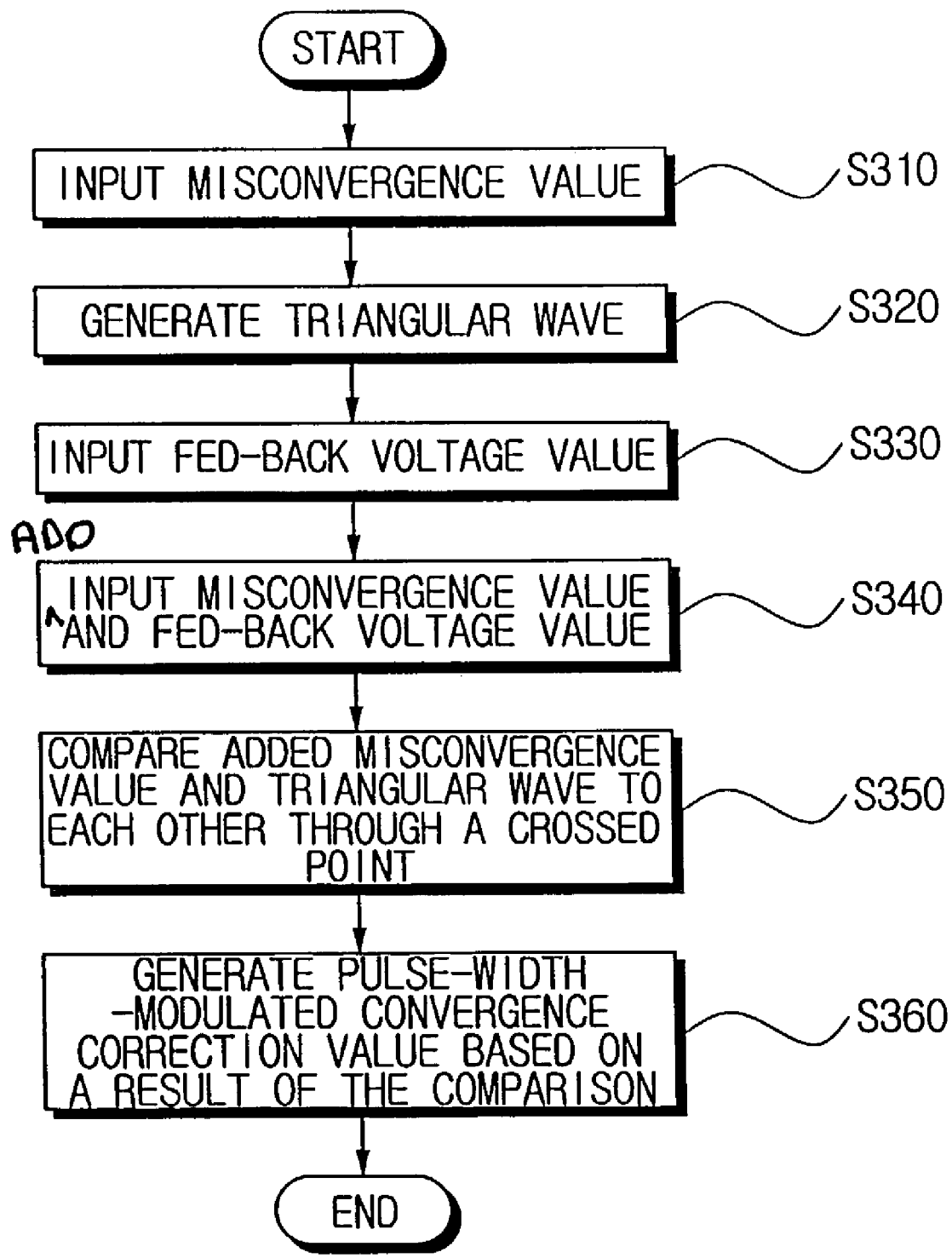
FIG. 13 is a flow chart for showing in detail a convergence correction value calculation step of FIG. 12.

FIG. 13 is a flow chart for showing the step S300 in more detail. First, the correction value input part 320 inputs the misconvergence value outputted from the distortion value calculator 200 (S310). At this time, the misconvergence value is below 2V. The triangular wave generator 310 generates a triangular wave based on set frequency and width (S320). The feedback input part 330 inputs the feedback voltage value (S330).

The adder 340 adds the misconvergence value inputted in the correction input part 320 and the voltage value inputted in the feedback input part 330 (S340). At this time, the added misconvergence value appears in one analog signal. The comparator 350 crosses the misconvergence value added in the adder 340 and the triangular wave generated in the triangular wave generator 310 and then compares the magnitudes of the values with each other (S350). The pulse wave generator 360 generates a pulse-width-modulated convergence correction value of a pulse waveform based on a result of the comparison of the comparator 350.

Accordingly, by constantly maintaining the amount of a current applied to the coil L for the misconvergence correction, a more exact misconvergence correction can be attained.

The present invention carries out the D-class amplification using field effect transistors to amplify a convergence correction value, so as to reduce a heat-sink plate size based on a reduced conducting resistance and lowered heat emissions when amplification operations are performed, enabling the entire size of a product to be manufactured smaller as well as the product cost to be lowered. Further, the present invention variably calculates a convergence correction value based on a voltage value fed back from a convergence yoke, enabling misconvergence to be more exactly corrected in the convergence yoke.

Although the preferred embodiments of the present invention has been described, it will be understood by those skilled in the art that the present invention should not be limited to the described preferred embodiments, but various changes and modifications can be made within the spirit and scope of the present invention as defined by the appended claims.

What is claimed is:

1. An image distortion correction apparatus, comprising:
   an image processing means for detecting an image signal and horizontal/vertical synchronous signals from a signal received from an external source;
   a distortion value calculation means for calculating a misconvergence value occurring when the image signal is scanned based on the horizontal/vertical synchronous signals;
   a correction value calculation means for calculating a convergence correction value of a pulse waveform to correct misconvergence of the image signal based on the misconvergence value;
   an amplification means for performing an amplification with respect to the convergence correction value; and
   a convergence yoke for controlling a path of an electron beam corresponding to the image signal based on the convergence correction value amplified in the amplification means.

2. The image distortion apparatus as claimed in claim 1, wherein the amplification is a D-class amplification.

3. The image distortion correction apparatus as claimed in claim 1, wherein the convergence correction value calculated by the correction value calculation means is an electric signal and the electric signal is below 2 volts.

4. The image distortion correction apparatus as claimed in claim 1, wherein the correction value calculation means comprises:
   a correction value input part for inputting the misconvergence value calculated into the distortion value calculation means;
   a triangular wave generation part for generating a triangular wave using a nonlinear device;
   a comparison part for comparing an added misconvergence value and a value of the triangular wave based on a point crossing the misconvergence value and the triangular wave; and
   a pulse wave generation part for generating a pulse width modulation signal based on a result of the comparison of the comparison part.

5. The image distortion correction apparatus as claimed in claim 4, wherein the correction value calculation means further comprises:
   a feedback input part for inputting the voltage value fed back from the convergence yoke; and
   an addition part for adding the misconvergence value inputted in the correction value input part and the voltage value inputted in the feedback input part, the pulse wave generation part generating a signal based on at least an addition of the misconvergence value and the voltage value in the addition part, and the convergence correction value based on the triangular wave generated from the triangular wave generation part.

6. The image distortion correction apparatus as claimed in claim 1, wherein the amplification means has a first amplifier and a second amplifier of a bridge structure for selectively amplifying and outputting the convergence correction value calculated from the correction value calculation means.

7. The image distortion correction apparatus as claimed in claim 6, wherein each of the first amplifier and the second amplifier comprises an N-channel Enhanced metal oxide semiconductor field effect transistor (N-channel E-MOS FET).

8. The image distortion correction apparatus as claimed in claim 6, wherein the convergence correction value amplified in the amplification means is an electric signal and the electric signal is below 25 volts.

9. The image distortion apparatus as claimed in claim 1, wherein the convergence yoke is fixed to a cathode ray tube (CRT).

10. The image distortion correction apparatus as claimed in claim 9, wherein the distortion value calculation means calculates a deflection distortion value occurring when the image signal is scanned based on the horizontal/vertical synchronous signals, and deflection yokes respectively mounted to the CRT are further included to apply certain currents for horizontal/vertical deflections of the electron beam of the image signal based on the deflection distortion value.

11. The image distortion correction apparatus as claimed in claim 10, wherein the deflection distortion value and the misconvergence value are below 2V.

12. The image distortion correction apparatus as claimed in claim 1, wherein the convergence yoke feeds back to the correction value calculation means a voltage value with respect to a current passing a coil, and the correction value calculation means calculates the convergence correction value based on at least the fed-back voltage value.

13. The image distortion correction apparatus as claimed in claim 12, wherein a low-pass filter arranged between the amplification means and the convergence yoke is further included for filtering the convergence correction value amplified in the amplification means.

14. The image distortion correction apparatus as claimed in claim 12, wherein the convergence yoke has a plurality of coils arranged in pairs in a circular symmetry structure and forming a certain magnetic field due to an applied current, and a current from an identical source is applied to the plurality of coils, and the amplification means amplifies the current of a voltage corresponding to the convergence correction value and outputs the amplified current to the convergence yoke.

15. The image distortion correction apparatus as claimed in claim 14, wherein the current from the identical source is applied to a symmetrically arranged pair of said plurality of coils.

16. The image distortion correction apparatus as claimed in claim 14, wherein the plurality of coils are four coils and the four coils are symmetrically formed two by two.

17. The image distortion correction apparatus as claimed in claim 16, wherein the convergence yoke controls a vertical path of the electron beam of the image signal based on the magnetic field formed on two symmetrically arranged coils, of the four coils, and controls a horizontal path of the electron beam of the image based on the magnetic field formed in the remaining two coils.

18. An image distortion correction method using an image distortion correction apparatus, comprising steps of:
   (a) detecting an image signal and horizontal/vertical synchronous signals of the image signal from a signal received from an external source;
   (b) calculating a misconvergence value occurring when the image signal is scanned based on the horizontal/vertical synchronous signals;
   (c) calculating a convergence correction value of a pulse waveform for correcting misconvergence with respect to the image signal based on the misconvergence value;
   (d) performing an amplification by using amplifiers with a small conducting resistance and low heat emissions with respect to the convergence correction value; and
   (e) controlling a path of an electron beam corresponding to the image signal by a magnetic field formed based on a passing current of the amplified convergence correction value.

19. The image distortion correction method as claimed in claim 18, wherein the convergence correction value is an electric signal and the electric signal is below 2V.

20. The image distortion correction method as claimed in claim 18, further comprising a step for filtering the amplified convergence correction value through a low pass filter, after the amplification step.

21. The image distortion correction method as claimed in claim 18, wherein the step (c) comprises substeps of:
   (l) inputting the misconvergence value;
   (m) generating a triangular wave based on a set frequency;
   (n) comparing an added misconvergence value and a value of the triangular wave based on a point at which the added misconvergence value and the triangular wave are crossed; and
   (o) generating a pulse-width-modulation signal based on a result of the comparison.

22. The image distortion correction method as claimed in claim 21, wherein the step (c) further comprises substeps of:
   inputting the fed-back voltage value; and
   adding the fed-back voltage value and the misconvergence value, and forming a signal based on the addition of the misconvergence value and the voltage value, and the convergence correction value which is based on the triangular wave generated in the step (o).

23. The image distortion correction method of claim 18, wherein in the step (d), the amplification is a D-class amplification performed by D-class amplifiers.

24. The image distortion correction method as claimed in claim 23, wherein the D-class amplifiers are N-channel enhanced metal oxide semiconductor field effect transistors arranged in a bridge structure with respect to two of the amplifiers.

25. The image distortion correction method as claimed in claim 23, wherein the D-class-amplified convergence correction value is an electric signal that is below 25V.

26. The image distortion correction method as claimed in claim 23, further comprising a step of feeding back a voltage value corresponding to a passing current of the D-class-amplified convergence correction value to the step (c), the convergence correction value being calculated based on at least the feed-back voltage value in the step (c).

* * * * *